United States Patent
Joo et al.

(10) Patent No.: US 7,483,366 B2
(45) Date of Patent: *Jan. 27, 2009

(54) STFBC CODING/DECODING APPARATUS AND METHOD IN AN OFDM MOBILE COMMUNICATION SYSTEM

(75) Inventors: Pan-Yuh Joo, Seoul (KR); Dae-Eop Kang, Seoul (KR); Eun-Seok Ko, Seoul (KR); Dae-Sik Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1114 days.

This patent is subject to a terminal disclaimer.

(21) Appl. No.: 10/292,065

(22) Filed: Nov. 12, 2002

(65) Prior Publication Data

US 2003/0137926 A1 Jul. 24, 2003

(30) Foreign Application Priority Data

Nov. 10, 2001 (KR) .................. 10-2001-0069996

(51) Int. Cl.
*H04J 11/00* (2006.01)
*H04J 1/00* (2006.01)
*H04K 1/10* (2006.01)
*H04L 27/28* (2006.01)

(52) U.S. Cl. .................. 370/208; 370/343; 370/480; 375/260

(58) Field of Classification Search .................. 370/208, 370/343, 480; 375/260
See application file for complete search history.

(56) References Cited

U.S. PATENT DOCUMENTS

| 2002/0054650 A1* | 5/2002 | Alamouti et al. ............ 375/295 |
| 2004/0022183 A1* | 2/2004 | Li et al. ...................... 370/210 |

FOREIGN PATENT DOCUMENTS

| JP | 09-266466 | 10/1997 |
| JP | 2000-228657 | 8/2000 |
| KR | 10-0661028 | 12/2006 |
| WO | WO 00/10301 | 2/2000 |

OTHER PUBLICATIONS

Y. Harada et al., An Implementation of OFDM Receiver for Digital Terrestrial Television Broadcasting and Its Technologies, Sep. 12-16, 1997.

* cited by examiner

*Primary Examiner*—Kevin C Harper
(74) *Attorney, Agent, or Firm*—The Farrell Law Firm, PC (57) ABSTRACT

A mobile communication system modulates input data with a specific size into an OFDM symbol and transmits the OFDM symbol through an antenna. In the mobile communication system, a replica generator generates OFDM symbol data by cyclic-circulating the input data by a predetermined cyclic circulation distance d, and outputs a stream of the input data and the replica data as a data stream.

20 Claims, 9 Drawing Sheets

STFBC CODING/DECODING APPARATUS AND METHOD IN AN OFDM MOBILE COMMUNICATION SYSTEM

PRIORITY

This application claims priority to an application entitled "STFBC Coding/Decoding Apparatus and Method in an OFDM Mobile Communication System" filed in the Korean Industrial Property Office on Nov. 10, 2001 and assigned Serial No. 2001-69996, the contents of which are hereby incorporated by reference.

BACKGROUND OF THE INVENTION

1. Field of the Invention

The present invention relates generally to a coding/decoding apparatus and method in an OFDM (Orthogonal Frequency Division Multiplexing) mobile communication system, and in particular, to a coding/decoding apparatus and method using an STTD (Space-Time block coding based Transmit Diversity) technique.

2. Description of the Related Art

An OFDM technique recently used for high-speed data transmission over a wire/wireless channel, a technique for transmitting data using multiple carriers, is a kind of MCM (Multi-Carrier Modulation) technique, which converts a stream of serial input symbols into parallel symbols and modulates each of the converted parallel symbols with a plurality of orthogonal subcarriers (or subchannels).

A system supporting the MCM technique, called an "MCM system," was first applied to a high-frequency radio for military use, in the late 1950's, and research on the OFDM technique for overlapping a plurality of orthogonal subcarriers has been made from 1970's. However, due to the difficulty in realizing orthogonal modulation between multiple carriers, the OFDM technique was rarely applied to an actual system. However, after Weinstein et al. proposed in 1971 that OFDM modulation/demodulation could be efficiently performed using DFT (Discrete Fourier Transform), active research has been carried out on the OFDM technique. In addition, as a technique of using a guard interval and inserting a cyclic prefix guard interval becomes generally known, it has become possible to reduce a negative influence on the system due to multipath and delay spread interference. Therefore, the OFDM technique has been widely applied to such digital transmission techniques as DAB (Digital Audio Broadcasting), digital television, WLAN (Wireless Local Area Network), WATM (Wireless Asynchronous Transfer Mode), and fixed BWA (Broadband Wireless Access). That is, the OFDM technique was not widely used due to its hardware complexity. However, as various digital signal processing techniques including FFT (Fast Fourier Transform) and IFFT (Inverse Fast Fourier Transform) have recently been developed, it has become possible to realize the OFDM technique. The OFDM technique, though similar to the conventional FDM (Frequency Division Multiplexing) technique, is characterized in that it has optimal transmission efficiency during high-speed data transmission by maintaining orthogonality between the multiple subcarriers. In addition, the OFDM technique, having high frequency utilization efficiency and strong resistance to multipath fading, is advantageous in that it has optimal transmission efficiency during high-speed data transmission. Further, the OFDM technique, since it overlaps frequency spectrums, has high frequency utilization efficiency and strong resistance to frequency selective fading and multipath fading, and can reduce inter-symbol interference (ISI) by utilizing a guard interval. In addition, it is possible to design an equalizer having a simple structure and strong resistance to impulse noises. Due to the advantages stated above, there is a growing trend for the OFDM technique to be widely used for the communication systems.

A transmitter and a receiver of a mobile communication system supporting the OFDM technique (hereinafter, referred to as "OFDM mobile communication system") will be briefly described.

In an OFDM transmitter, input data is modulated with subcarriers through a scrambler, encoder and interleaver. The transmitter provides a variety of variable rates, and has a coding rate, an interleaving size and a modulation technique, which can be changed according to a data rate. Commonly, the encoder uses a coding rate of ½ and ¾, and an interleaving size for preventing a burst error is determined according to the number of coded bits per OFDM symbol (NCBPS). The modulation technique includes QPSK (Quadrature Phase Shift Keying), 8 PSK (8-ary Phase Shift Keying), 16 QAM (16-ary Quadrature Amplitude Modulation) and 64 QAM (64-ary Quadrature Amplitude Modulation) according to the data rate. Meanwhile, a predetermined number of pilots are added to the signal modulated with a predetermined number of subcarriers, and the pilot-added signal undergoes IFFT, generating one OFDM symbol. Thereafter, a guard interval for preventing the inter-symbol interference in the multipath channel environment is inserted in the OFDM symbol, and the guard interval-inserted OFDM symbol is finally applied to an RF (Radio Frequency) processor through a symbol wave generator, and then transmitted over a channel.

In an OFDM receiver corresponding to the transmitter, a reverse operation of the operation performed by the transmitter is performed and a synchronization process is added. First, the receiver performs a process of estimating a frequency offset and a symbol offset of a received OFDM symbol by utilizing a training symbol. Thereafter, a guard interval-eliminated data symbol is restored to a predetermined number of pilot-added subcarriers through an FFT block. In addition, in order to overcome a propagation delay phenomenon on an actual wireless channel, an equalizer estimates a channel condition of a received channel signal and eliminates signal distortion on the actual wireless channel from the received channel signal. The channel estimated data through the equalizer is converted to a bit stream, and then output as final data through a deinterleaver, a decoder for error correction, and a descrambler.

Although the OFDM technique has a strong resistance to frequency selective fading, its performance is limited. A typical example of improved general techniques proposed to overcome performance limitations is a diversity technique using multiple antennas. The diversity technique is classified into a time diversity technique, a frequency diversity technique and a space diversity technique.

The time diversity technique is generally provided by a channel coding technique combined with an interleaving technique. In the case of the time diversity technique, as a time variation of a channel becomes greater, its gain increases. Frequency diversity can be obtained by transmitting a signal with different frequencies thereby generating a multipath component of a channel. Therefore, the frequency diversity is also called "path diversity," and a Rake receiver in a DS-CDMA (Direct Spread-Code Division Multiple Access) mobile communication system is a typical example of the frequency diversity. Space diversity can be obtained by generating independent fading channels through multiple transmission and reception antennas.

In order to improve reception performance in the OFDM mobile communication system, a number of diversity techniques have also been proposed. However, most of the diversity techniques simply combine the techniques previously proposed in other systems, rather than utilizing the unique characteristic of the OFDM mobile communication system. Accordingly, there have been demands for a method of obtaining a maximum diversity gain with low complexity by making the best use of the characteristic of the OFDM mobile communication system.

Now, a structure of a transmitter for an OFDM mobile communication system will be described with reference to FIG. 1.

Figure 1:
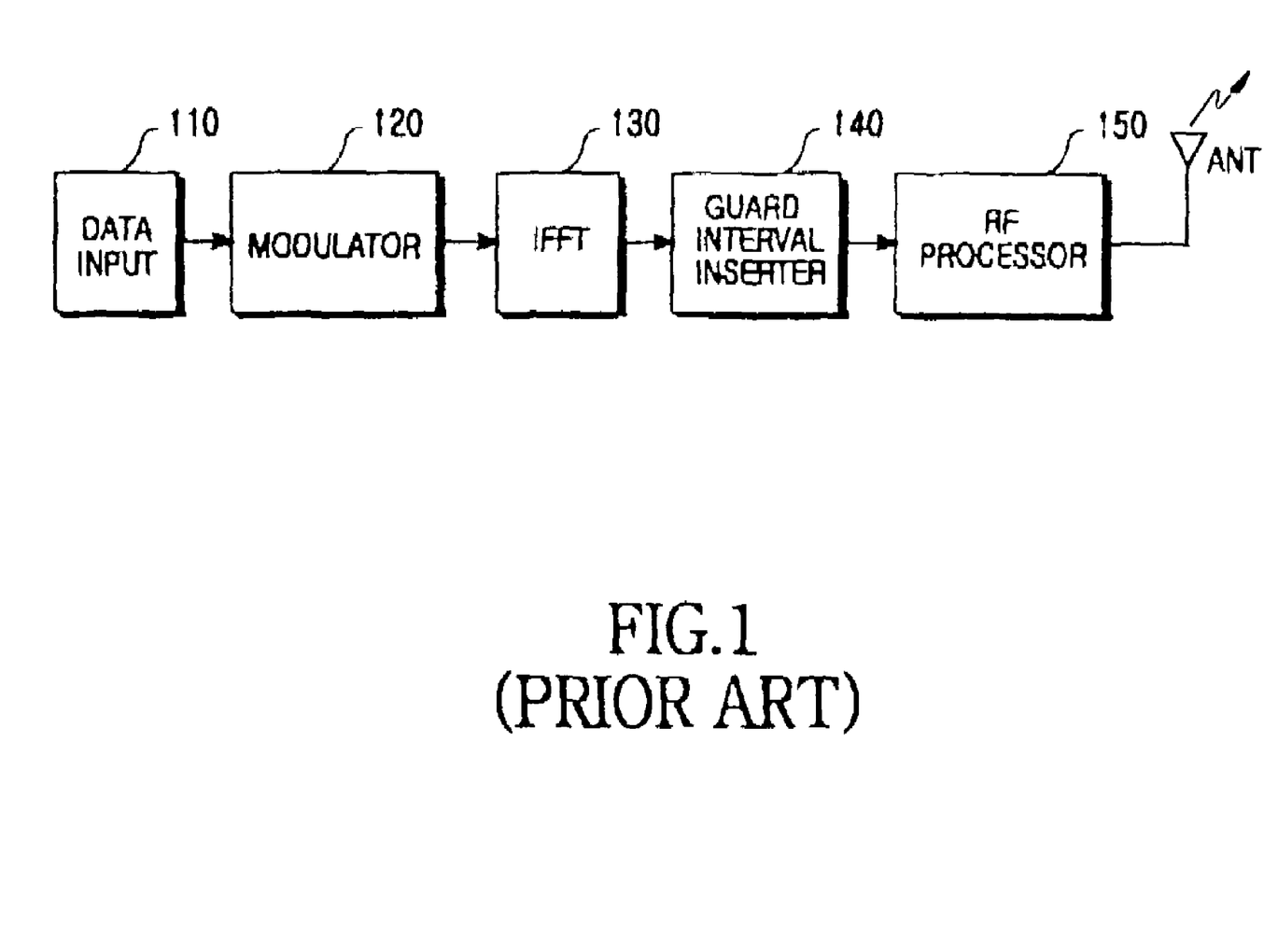
FIG. 1 illustrates a structure of a transmitter in a general OFDM mobile communication system.

FIG. 1 illustrates a structure of a transmitter in a general OFDM mobile communication system. Referring to FIG. 1, the transmitter encodes input data into coded bits at a given coding rate, and interleaves the coded bits, thus generating data 110. The generated data 110 is provided to a modulator (or QPSK/QAM mapper) 120. Although there have been proposed various coding techniques, the transmitter typically employs a coding technique using a turbo code, or an error correction code. Further, the transmitter generally uses a coding rate of ½ and ¾. The modulator 120 modulates the input data 110 by a predetermined modulation technique, and outputs modulated symbols. Here, the modulation technique includes QPSK, 8 PSK, 16 QAM and 64 QAM, and each of the modulation techniques performs modulation by its unique symbol mapping technique. It will be assumed in FIG. 1 that QPSK and QAM are used as the modulation technique. The modulated symbols output from the modulator 120 are provided to a first IFFT block 130. The IFFT block 130 generates an OFDM symbol by performing IFFT on the modulated symbol. The OFDM symbol output from the IFFT block 130 is provided to a guard interval inserter 140. The guard interval inserter 140 inserts a guard interval in the OFDM symbol output from the IFFT block 130. Transmission of the OFDM symbol is commonly performed in a block unit. However, the OFDM symbol is affected by a previous symbol, while it is transmitted over a multipath channel. In order to prevent interference between the OFDM symbols, the guard interval is inserted between consecutive blocks. The guard interval-inserted OFDM symbol from the guard interval inserter 140 is transmitted over a multipath channel through an antenna ANT after being up-converted by an RF processor 150.

Next, a structure of a receiver for an OFDM mobile communication system will be described with reference to FIG. 2.

Figure 2:
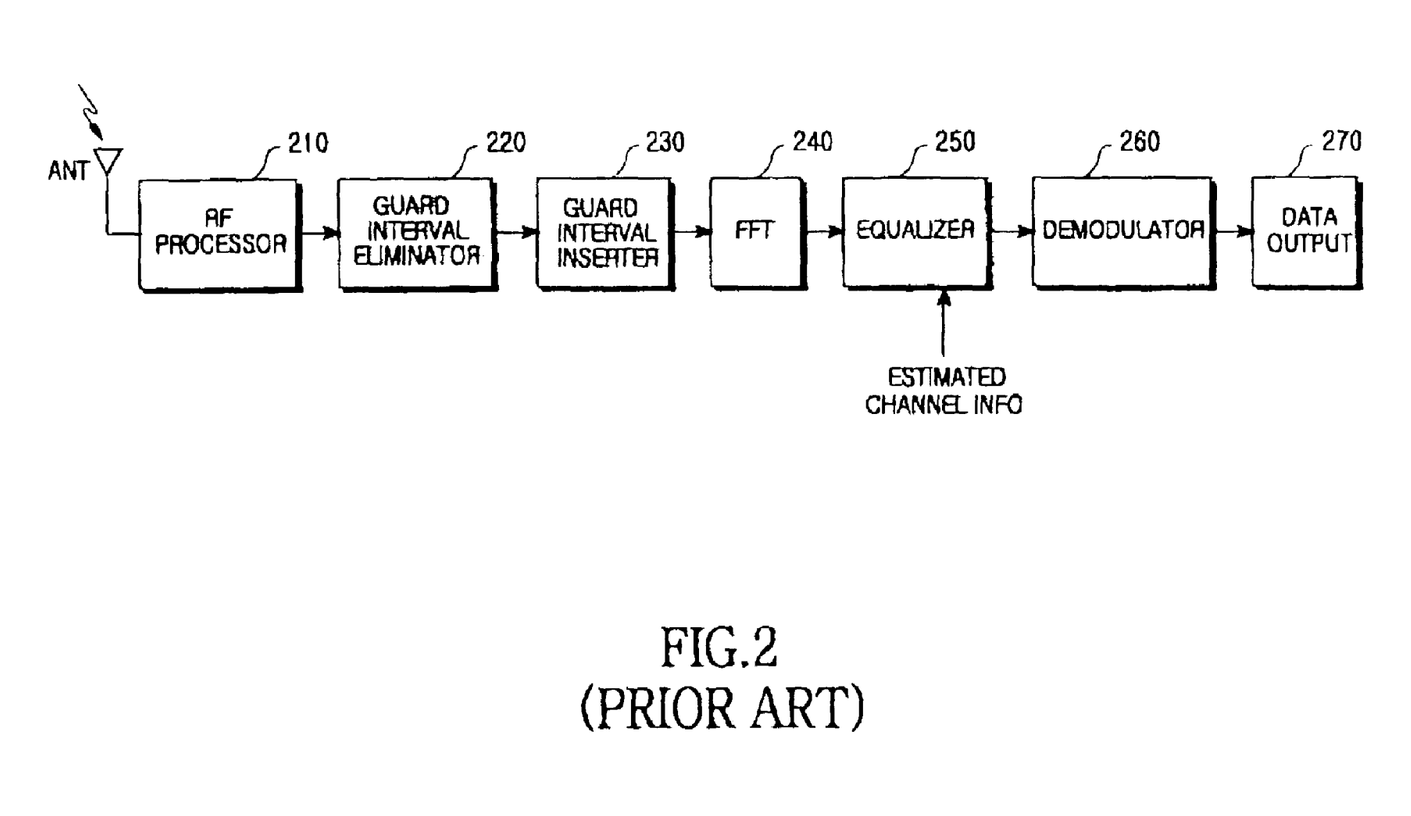
FIG. 2 illustrates a structure of a receiver in a general OFDM mobile communication system.

FIG. 2 illustrates a structure of a receiver in a general OFDM mobile communication system. Referring to FIG. 2, a signal transmitted from a transmitter over a multipath channel is received at an RF processor 210 through an antenna ANT. The RF processor 210 down-converts the RF signal received through the antenna ANT into an IF (Intermediate Frequency) signal, and provides the IF signal to a guard interval eliminator 230. The guard interval eliminator 230 eliminates the guard interval inserted into the OFDM symbol output from the RF processor 210. The guard interval-eliminated OFDM symbol is provided to an FFT block 240. The FFT block 240 generates a modulated symbol through an FFT process.

If the OFDM mobile communication system uses N subcarriers, a signal output from the FFT block 240 can be represented by $$r(k) = H(k)X(k) + n(k), 0 \leq k \leq N-1 \quad \text{Equation (1)}$$

Equation (1) can be rewritten in a determinant, as follows $$r = H \cdot X + n \quad \text{Equation (2)}$$

In Equation (2), r denotes an N×1 reception symbol vector, X denotes an N×1 transmission symbol vector, n denotes an N×1 noise vector, and H denotes an N×N diagonal matrix representing a frequency response of a channel. Since a frequency selective fading channel is expressed as a frequency ratio selective fading channel, the receiver has a good characteristic for the frequency selective fading channel having multiple paths.

As stated above, since the received symbol is represented by the simple product of a channel frequency response and a transmission signal, it is possible to restore a signal with a simple equalizer such as a one-tap equalizer 250. If it is assumed that the receiver fully recognizes the channel information, an equalization process performed by the equalizer 250 is represented by $$\hat{X}(k) = \frac{r(k)}{H(k)}, \quad \text{Equation (3)}$$

Equation (3) can be rewritten in a determinant, as follows $$\hat{X} = H^{-1} \cdot r \quad \text{Equation (4)}$$

A transmission symbol for the equalized signal is determined through a demodulator (or QPSK/QAM demapper) 260. The demodulator 260 demodulates the modulated symbols symbol-mapped by a predetermined modulation technique and outputs coded bits, and the coded bits are restored to an original signal through interleaving and decoding processes.

As stated above, the OFDM mobile communication system is designed to overcome the inter-symbol interference caused by the wireless channel. However, the OFDM mobile communication system is not highly resistant to signal attenuation due to a multipath phenomenon of the wireless channel. In order to prevent a performance deterioration due to the fading channel, there has been proposed an OFDM mobile communication system supporting a diversity technique. However, most of the previously proposed mobile communication systems simply combine the techniques previously proposed in other systems, rather than utilizing the unique characteristic of the OFDM mobile communication system.

That is, the OFDM mobile communication system has considerable performance degradation due to the multipath fading phenomenon. Therefore, it is necessary to use a diversity technique for overcoming such a phenomenon. However, in order to utilize the ever proposed diversity techniques in the OFDM mobile communication system, a transmitter and a receiver with a complex structure are required. In addition, since the latest space diversity technique using multiple antennas must increase the number of transmission and reception antennas, the transmitter and the receiver increase in size, and the existing system, rendering the system useless in many contexts. Accordingly, there have been demands for a diversity technique suitable for the OFDM mobile communication system by making the best use of the characteristic of the OFDM mobile communication system. In addition, there have been demands for a method of obtaining a diversity gain with reduced complexity by utilizing the unique characteristic of the OFDM mobile communication system.

SUMMARY OF THE INVENTION

It is, therefore, an object of the present invention to provide an apparatus and method for overcoming distortion due to a multipath fading phenomenon of a space-time block code, by OFDM (Orthogonal Frequency Division Multiplexing).

It is another object of the present invention to provide an STFBC (Space-Time-Frequency Block Code) coding/decoding apparatus and method capable of efficiently using frequency diversity.

It is further another object of the present invention to provide an apparatus and method for obtaining a diversity gain, by using one transmission antenna and one reception antenna.

It is yet another object of the present invention to provide an apparatus and method for performing every process by a linear operation in an OFDM mobile communication system supporting the STTD technique.

It is still another object of the present invention to provide an apparatus and method for obtaining a maximum frequency diversity gain using a cyclic circulation technique in an OFDM mobile communication system.

It is still another object of the present invention to provide an apparatus and method for obtaining a maximum frequency diversity gain with only a cyclic circulation device by making use of a statistical characteristic of a channel in an OFDM mobile communication system.

It is still another object of the present invention to provide an apparatus and method for improving system performance with low complexity by making the best use of a characteristic of an OFDM mobile communication system.

In accordance with one aspect of the present invention, there is provided a transmission apparatus in a mobile communication system which modulates input data with a specific size into an OFDM symbol and transmits the OFDM symbol through an antenna. A replica generator generates replica data by cyclic-circulating the input data by a predetermined cyclic circulation distance d, and outputs a stream of the input data and the replica data as a data stream. An IFFT (Inverse Fast Fourier Transform) block performs IFFT on the data stream output from the replica generator, and generates a stream of OFDM symbols.

In accordance with another aspect of the present invention, there is provided a transmission method in a mobile communication system which modulates input data with a specific size into an OFDM symbol and transmits the OFDM symbol through an antenna. The method comprises generating replica data by cyclic-circulating the input data by a predetermined cyclic circulation distance d, and outputting a stream of the input data and the replica data as a data stream, performing IFFT on the data stream, and generating a stream of OFDM symbols.

In accordance with a further aspect of the present invention, there is provided a reception apparatus for receiving a stream of OFDM symbols from a transmitter through a reception antenna in a mobile communication system which modulates input data with a specific size into an OFDM symbol and transmits the stream of OFDM symbols through a transmission antenna. An FFT block generates a stream of data by performing FFT on the stream of OFDM symbols received through the reception antenna. A frequency diversity combiner separates the stream of data into a stream of cyclic-circulated data and a stream of non-cyclic-circulated data, inversely cyclic-circulates the stream of cyclic-circulated data by a predetermined cyclic circulation distance d, and adds the stream of inversely cyclic-circulated data and the steam of non-cyclic-circulated data, thereby outputting a stream of data.

In accordance with yet another aspect of the present invention, there is provided a reception method for receiving a stream of OFDM symbols from a transmitter through a reception antenna in a mobile communication system which modulates input data with a specific size into an OFDM symbol and transmits the stream of OFDM symbols through a transmission antenna. The method comprises generating a stream of data by performing FFT (Fast Fourier Transform) on the stream of OFDM symbols received through the reception antenna, and separating the stream of data into a stream of cyclic-circulated data and a stream of non-cyclic-circulated data, inversely cyclic-circulating the stream of cyclic-circulated data by a predetermined cyclic circulation distance d, and adding the stream of inversely cyclic-circulated data and the steam of non-cyclic-circulated data, thereby outputting a stream of data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention proposes a cyclic circulation technique as a method for obtaining a maximum frequency diversity gain. The proposed cyclic circulation technique can obtain a maximum frequency diversity gain with a simple operation by utilizing a unique characteristic of the OFDM mobile communication system, wherein a covariance matrix of a channel is a cyclic Hermitian matrix.

In a transmitter for obtaining the maximum frequency diversity gain, a frequency diversity encoder is constructed as follows. Upon receiving one OFDM symbol comprised of N subcarriers, the encoder generates a different OFDM symbol by cyclic-circulating the received OFDM symbol by a cyclic circulation distance d. Here, the cyclic circulation distance d is calculated using a statistical characteristic of a channel in the OFDM mobile communication system, and can be defined as $$d = \left\lfloor \frac{N}{L} \right\rfloor \cdot \left\lfloor \frac{L}{2} \right\rfloor.$$

Herein, L is length of the delay spread. The cyclic-circulated OFDM symbol and the original OFDM symbol are selectively sequentially transmitted in a symbol unit. For example, if the original OFDM symbol were first transmitted, the cyclic-circulated OFDM symbol will be transmitted next.

In a receiver, the signal is restored by a reverse operation of the operation performed by the transmitter. First, the receiver receives two OFDM symbols. Next, the receiver multiplies each OFDM symbol by a complex conjugate of a channel based on channel information of the two received OFDM symbols. Since a second OFDM symbol among the two OFDM symbols multiplied by the complex conjugate is a signal generated by cyclic-circulating the original OFDM symbol by d, the receiver restores the second OFDM symbol in its original order by inversely cyclic-circulating it. The receiver performs frequency diversity combining by adding the inversely cyclic-circulated symbol and the original symbol. The receiver determines the combined symbol as the nearest signal based on the channel information.

In this manner, the embodiment of the present invention can obtain a second-order frequency diversity gain. In addition, the embodiment performs every process by linear processing.

1. Covariance Matrix of Channel in OFDM System

An impulse response g(t) of a frequency selective fading channel having L multiple paths is modeled with an FIR (Finite Impulse Response) filter having L taps. This can be represented by $$g(t) = \sum_{i=0}^{L-1} h(i)\delta(t - \tau_i) \quad \text{Equation (5)}$$

$$\delta(t) = \begin{cases} 1, t = 0 \\ 0, \text{elsewhere}. \end{cases}$$

In Equation (5), h(i) denotes an attenuation coefficient of a channel impulse response on an $i^{th}$ path, and $\tau_i$ denotes a delay time on the $i^{th}$ path. Herein, delta (t) is unit impulse function, see the equation in line 6-7. Since a channel is modeled with the FIR filter, the $\tau_i$ is equal to a sampling gap. In a system using multiple antennas, each channel coefficient h(i) is modeled with an independent complex Gaussian random variable having an average of zero. Therefore, the amplitude of each channel tap constitutes Rayleigh distribution or Rician distribution, and a phase of each channel tap constitutes a uniform distribution. In addition, it can be assumed that a power delay profile of a channel is uniform or has exponential distribution.

If the power delay profile of a channel is uniform in the OFDM mobile communication system, a frequency response of a channel corresponding to a $k^{th}$ subcarrier of an OFDM symbol that underwent FFT in the receiver can be expressed as $$H(k) = \sum_{i=0}^{L-1} h(i)e^{-j2\pi ki/N}, 0 \le k \le N-1 \quad \text{Equation (6)}$$

In Equation (6), N denotes the total number of subcarriers for an OFDM symbol. In order to calculate a covariance matrix of a channel, a correlation between a frequency response of a channel corresponding to a $k^{th}$ subcarrier and a frequency response of a channel corresponding to a $(k+\Delta k)^{th}$ subcarrier is calculated by $$\rho_{\Delta k} = E[H(k)H^*(k + \Delta k)] \quad \text{Equation (7)}$$

$$= E\left[\left(\sum_{i=0}^{L-1} h(i)e^{-j2\pi ki/N}\right) \cdot \left(\sum_{i=0}^{L-1} h(i)e^{-j2\pi(k+\Delta k)i/N}\right)^*\right]$$

$$= E\left[\sum_{i=0}^{L-1} h(i)h^*(i)e^{j2\pi\Delta ki/N}\right]$$

$$= \sum_{i=0}^{L-1} \sigma_i^2 e^{j2\pi\Delta ki/N}$$

In Equation (7), coefficients of the channel taps are used to expand non-correlation characteristics by formula. Herein, it is noted that E is expectation and is well known. In Equation (7), $\sigma_i^2$ represents a variance of an $i^{th}$ channel tap coefficient and is equal to power of an $i^{th}$ path on a channel. Since the power delay profile of a channel is uniform, $\sigma_i^2=1/L$, and the $\sigma_i^2$ values of the respective paths are independent of each other. Therefore, the following equation is derived from Equation (7).

$$\rho_{\Delta k} = \frac{1}{L}\sum_{i=0}^{L-1} e^{j2\pi\Delta ki/N} \quad \text{Equation (8)}$$

$$= \frac{1}{L}1 - \frac{e^{j2\pi\Delta kL/N}}{1 - e^{j2\pi k/N}}$$

$$= \frac{1}{L}\frac{\sin\left(\frac{\pi\Delta kL}{N}\right)}{\sin\left(\frac{\pi\Delta k}{N}\right)}e^{j\pi\Delta k(L-1)/N}$$

A channel vector H in Equation (8) is defined as $$H = [H(0)H(1)\ldots H(N-1)]^T \quad \text{Equation (9)}$$

where $H^T$ is transpose of vector H.

Therefore, the whole covariance matrix $C_H$ is calculated by $$C_H = E[HH^H] \quad \text{Equation (10)}$$

$$= \begin{bmatrix} \rho_0 & \rho_1 & \cdots & \rho_{N-1} \\ \rho_{-1} & \rho_0 & \cdots & \rho_{N-2} \\ \vdots & \vdots & \ddots & \vdots \\ \rho_{-N+1} & \rho_{-N+2} & \cdots & \rho_0 \end{bmatrix}$$

In the matrix of Equation (10), the $\rho_{\Delta k}$ has the following characteristics in accordance with Equation (8).

First characteristic: $\rho_{-\Delta k} = \rho_{\Delta k}{}^*$
Second characteristic: $|\rho_{-\Delta k}| = |\rho_{\Delta k}|$
Third characteristic: $\rho_{-\Delta k} = \rho_{N-\Delta k}$ The whole covariance matrix $C_H$ is expressed as a cyclic Hermitian matrix by the first to third characteristics.

In the foregoing description, it is assumed that a power delay profile of each channel is uniform. However, in the case where the power delay profile of each channel is not uniform, although a covariance of a channel is not circulated by simulation verification, the above circulation characteristic of a subcarrier is satisfied by constructing a matrix on the basis of a subcarrier position having the minimum correlation.

2. Selection of Optimal Subcarrier for Obtaining Maximum Frequency Diversity

A fundamental concept of diversity is to enable a receiver to receive replicas of a signal having the same information through independent fading channels. Therefore, in the OFDM mobile communication system, the same signal is transmitted with different subcarriers in order to obtain frequency diversity. However, in order to obtain a maximum diversity gain, replicas of each signal must be received through independent fading channels. Therefore, in order to acquire the maximum frequency diversity gain, the OFDM mobile communication system detects subcarriers having non-correlation with each other and then transmits the replicas through the detected subcarriers.

In addition, the complex Gaussian random variable, though it passes through FFT, has a constant characteristic. The reason is because the FFT is a linear function. Therefore, a frequency response $H(k)$ of a channel is modeled with a complex Gaussian random variable having an average of zero and single distribution. Thus, if two Gaussian random variables have non-correlation due to the Gaussian distribution characteristic, the two random variables are independent of each other. For example, if a channel $H(k_2)$ for a $k_2^{th}$ subcarrier having non-correlation with a channel $H(k_1)$ for a $k_1^{th}$ subcarrier is searched, the two channels are independent of each other.

A correlation between a channel $H(k_1)$ for a $k_1^{th}$ subcarrier and a channel $H(k_2)$ for a $k_2^{th}$ subcarrier is defined as $$\rho_{k_1 k_2} = E[H(k_1)H^*(k_2)] \quad \text{Equation (11)}$$

$$= \frac{1}{L} \frac{\sin\left(\frac{\pi(k_2 - k_1)L}{N}\right)}{\sin\left(\frac{\pi(k_2 - k_1)}{N}\right)} e^{j\pi(k_2 - k_1)(L-1)/N}$$

In Equation (11), for non-correlation between the two channels, a condition of $\rho_{k_1 k_2} = 0$ must be satisfied. Therefore, in order to satisfy this condition, Equation (11) should satisfy Equation (12) below.

$$\sin\left(\frac{\pi \Delta k_{12} L}{N}\right) = 0 \quad \text{Equation (12)}$$

In Equation (12), $\Delta k_{12} = k_2 - k_1$, and $\Delta k_{12} \neq 0$. As illustrated in Equation (12), the two independent channels are given as a function of a distance between two subcarriers. Therefore, a general solution of Equation (12) becomes $$\Delta k_{12} = \frac{mN}{L} \quad \text{Equation (13)}$$

In Equation (13), m is an integer excluding 0. However, since $\Delta k_{12}$ has a restricted range, then according to Equation (13), m is also restricted. However, it is possible to set $k_1$ to 0 ($k_1 = 0$) while maintaining universality. Then, since $1 \leq \Delta k_{12} \leq N-1$, the following relationship is given $$\frac{L}{N}\pi \leq \frac{\pi \Delta k_{12} L}{N} \leq L\pi - \frac{L}{N}\pi \quad \text{Equation (14)}$$

Equation (14), if it is applied to Equation (13), is rewritten as $$\frac{L}{N} \leq m \leq L - \frac{L}{N} \quad \text{Equation (15)}$$

In Equation (15), m is an integer, and L and N are natural numbers, so m has a range of $1 \leq m \leq L-1$.

Therefore, the number of subcarriers having non-correlation with a $0^{th}$ subcarrier is L-1. Thus, the number of independent subcarrier channels including the $0^{th}$ subcarrier becomes L. Based on the third characteristic for the covariance matrix of a channel, the number of subcarriers independent of a $k^{th}$ subcarrier in a channel having L paths becomes L.

3. STFBC for Obtaining Maximum Frequency Diversity

When providing an STFBC (Space-Time-Frequency Block Code) according to an embodiment of the present invention, the following should be taken into consideration.

(1) maximum frequency and space diversity gains
(2) maintenance of maximum distance between all subcarriers
(3) strong correlation characteristic of channel In order to obtain the maximum frequency space diversity, which should be first taken into consideration, the OFDM mobile communication system detects subcarriers having non-correlation with each other and then transmits the replicas through the detected subcarriers. Now, correlations between a certain subcarrier and other subcarriers will be described with reference to FIG. 9.

Figure 9:
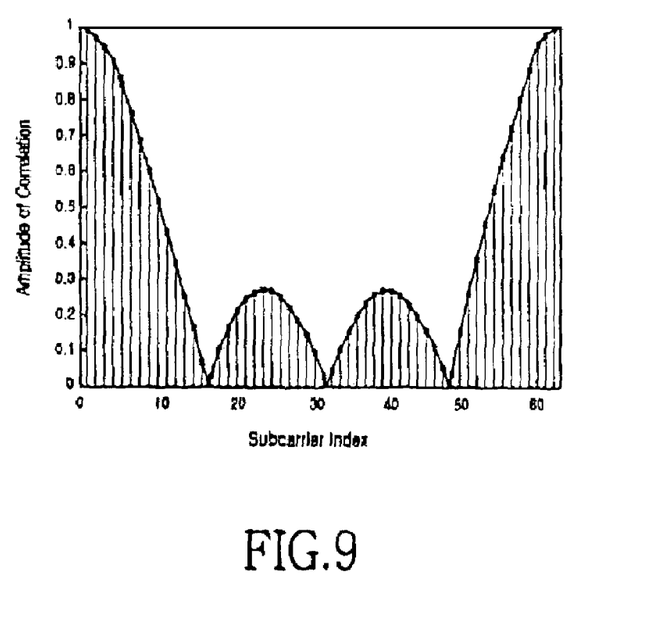
FIG. 9 illustrates correlations between a $0^{th}$ subcarrier and other subcarriers according to an embodiment of the present invention.

FIG. 9 illustrates correlations between a $0^{th}$ subcarrier and other subcarriers according to an embodiment of the present invention. Specifically, FIG. 9 is a graph illustrating amplitudes of correlations between a $0^{th}$ subcarrier and other subcarriers, wherein the channels have the same power delay profile when L=4 and N=64.

Referring to FIG. 9, it is noted that amplitude of a correlation is reduced more and more, as a subcarrier index value gets nearer to the center. The amplitudes of the correlations are symmetrical in shape according to the second characteristic of the covariance matrix of a channel. Therefore, in order to provide the strong correlation characteristic of a channel, which should be thirdly taken into consideration, it is necessary to transmit replicas of a symbol through center subcarriers having less correlation with each other. In addition, since a covariance matrix of a channel is cyclic-circulated according to the third characteristic of the covariance matrix of a channel, each row in the matrix has a cyclic-circulated form of a first row (indicating correlation with the $0^{th}$ subcarrier). Therefore, independent channels for the respective subcarriers are cyclic-circulated one after another. Accordingly, a preferred way to satisfy the matter that should be thirdly taken into consideration is to separate the subcarriers' positions by N/2. By doing so, all subcarriers are evenly separated by N/2, thus maintaining the maximum distance. As a result, a subcarrier satisfying the matter that should be first taken into consideration while satisfying the matters that should be secondly and thirdly taken into consideration is shown in FIG. 9 to be the centermost subcarrier among the three subcarriers having a correlation of 0. Therefore, the subcarriers having non-correlation are determined by dividing all the subcarriers by L in accordance with Equation (13), and since Δk is an integer, an optimal Δk for the three matters that should be taken into consideration is defined as $$\Delta k = d = \left\lfloor \frac{N}{L} \right\rfloor \cdot \left\lfloor \frac{L}{2} \right\rfloor \qquad \text{Equation (16)}$$

In Equation (16), $\lfloor x \rfloor$ represents a maximum integer smaller than a value x.

Since the correlation is cyclic-circulated according to the third characteristic of the covariance matrix of a channel, an optimal subcarrier k' for a $k^{th}$ subcarrier is calculated by $$k' = (k+d) \bmod N \qquad \text{Equation (17)}$$

In Equation (17), "mod" represents a modulo operation. Now, with reference to FIG. 10, a description will be made of replicas' positions for obtaining the maximum frequency diversity, for example, for L=4 and N=8.

Figure 10:
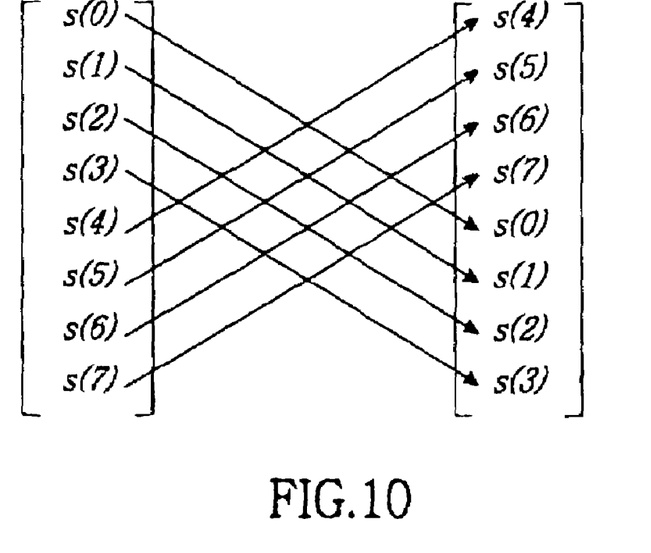
FIG. 10 illustrates positions of replicas for obtaining the maximum frequency diversity according to an embodiment of the present invention.

FIG. 10 illustrates replicas' positions for obtaining the maximum frequency diversity according to an embodiment of the present invention. Referring to FIG. 10, all subcarriers transmit replicas over subcarriers in the positions separated by N/2, as stated above. In FIG. 10, since the number of subcarriers is 8 (i.e., N=8), the replicas are carried by subcarriers separated by 8/2 (=4) subcarriers. That is, a replica of a first subcarrier is transmitted on a replica of a fifth subcarrier, and a replica of a second subcarrier is transmitted on a replica of a sixth subcarrier. In this manner, a subcarrier of an eighth subcarrier is transmitted on a subcarrier of a fourth subcarrier.

Now, a detailed description of the embodiment of the present invention will be described with reference to the accompanying drawings.

(1) Frequency Diversity Transmitter Using Cyclic Circulation

Figure 3:
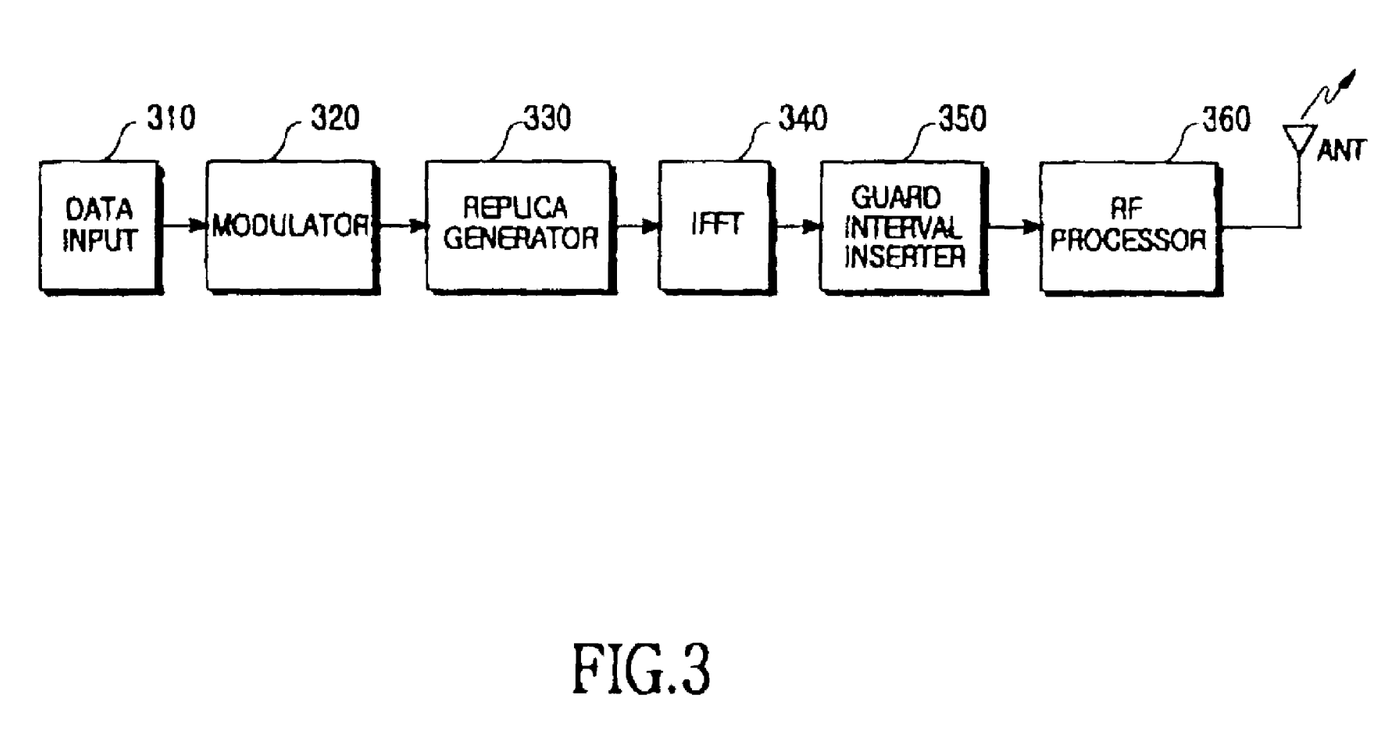
FIG. 3 illustrates a structure of a transmitter in an OFDM mobile communication system according to an embodiment of the present invention.

FIG. 3 illustrates a structure of a transmitter in an OFDM mobile communication system according to an embodiment of the present invention. Referring to FIG. 3, input data 310 is provided to a modulator 320, and the modulator (or QPSK/QAM mapper) 320 buffers the input data 312 as many times as the number N of subcarriers and outputs one OFDM symbol s. The OFDM symbol s output from the modulator 320 is expressed as $$s = [s(0) \ldots s(N-1)]^T \qquad \text{Equation (18)}$$

In order to obtain the maximum frequency diversity, the transmitter generates another OFDM symbol by means of a replica generator 330, before transmitting the modulated symbol s. That is, the OFDM symbol s output from the modulator 320 is provided to the replica generator 330, and the replica generator 330 generates two different OFDM symbols. For the replica generator 330, the present invention proposes a structure for generating a replica of the modulated symbol s by cyclic-circulating the modulated symbol s by a predetermined value. Therefore, among the two OFDM symbols output from the replica generator 330, one OFDM symbol is identical to the original OFDM symbol s, and the other OFDM symbol is generated by cyclic-circulating the OFDM symbol s by calculating a cyclic circulation distance d by Equation (16) and substituting the calculated cyclic circulation distance d into Equation (17). That is, the two OFDM symbols output from the replica generator 330 become $X_1$ and $X_2$. The OFDM symbols $X_1$ and $X_2$ are represented by $$X_1 = s = [s(0) \ldots s(N-d-1)s(N-d) \ldots s(N-1)]^T$$

$$X_2 = [s(N-d) \ldots s(N-1)s(0) \ldots s(N-d-1)]^T.$$

Now, a process of calculating the cyclic circulation distance d will be described with reference to FIG. 7.

Figure 7:
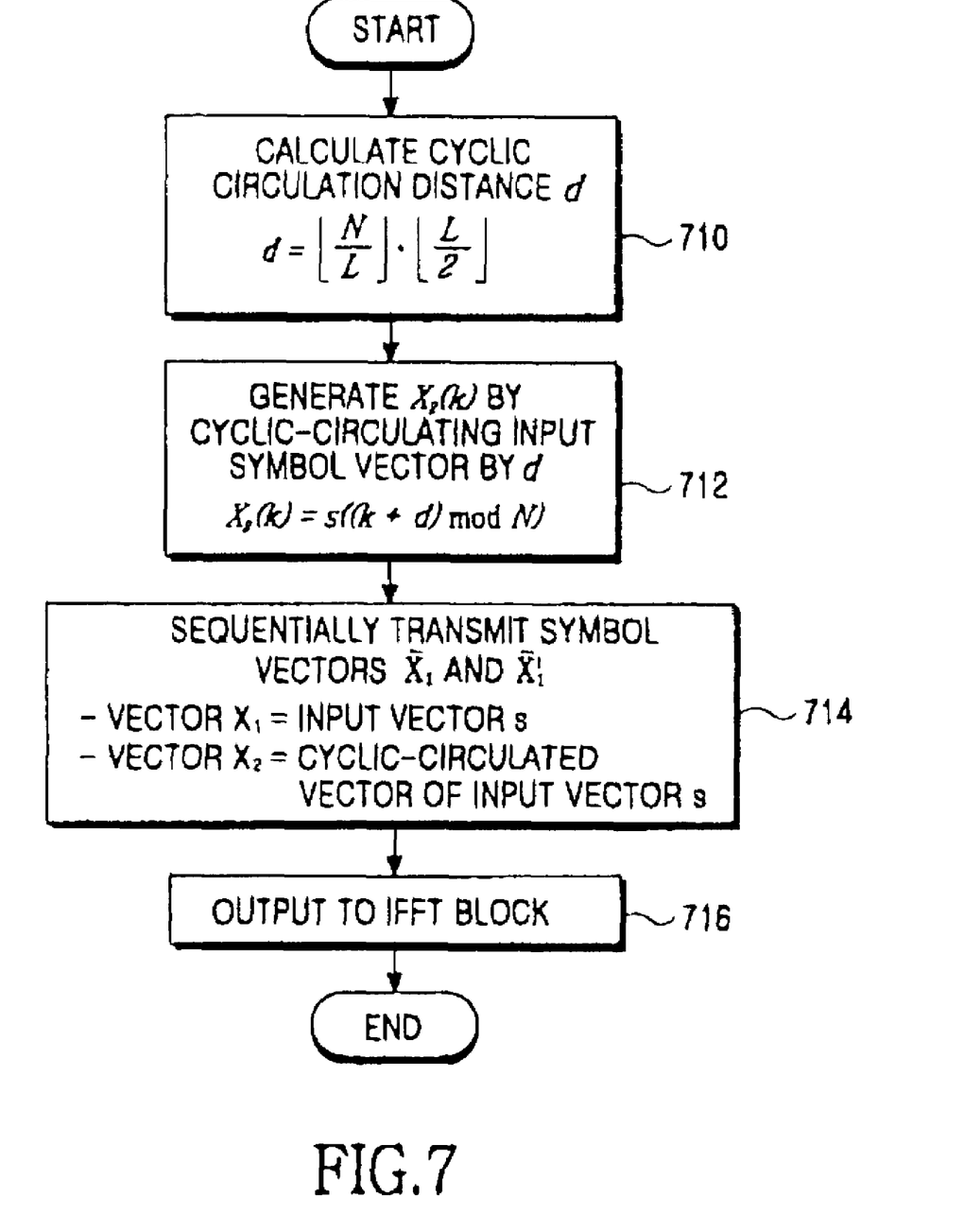
FIG. 7 illustrates an operation of a transmitter according to an embodiment of the present invention.

FIG. 7 illustrates an operation of a transmitter according to an embodiment of the present invention. Referring to FIG. 7, in step 710, the transmitter calculates a cyclic circulation distance d for the OFDM symbol s, and then proceeds to step 712. In step 712, the transmitter generates a replica $X_2$ by cyclic-circulating a symbol vector for the OFDM symbol s by the calculated cyclic circulation distance d, and then proceeds to step 714. Here, a detailed operation and structure for calculating the cyclic circulation distance d for the OFDM symbol s in step 710 and generating a replica for the OFDM symbol s based on the calculated cyclic circulation distance d in step 712, is illustrated in FIG. 5.

Figure 5:
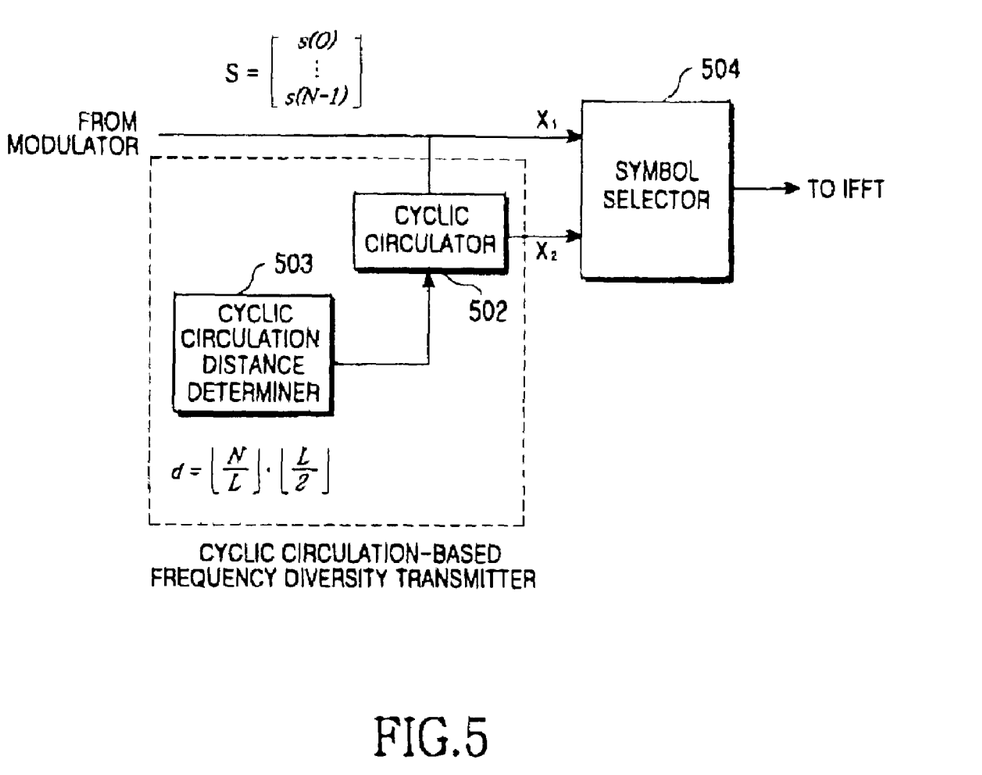
FIG. 5 illustrates a detailed structure of the replica generator shown in FIG. 3.

FIG. 5 illustrates a detailed structure of the replica generator 330 of FIG. 3. Referring to FIG. 5, the OFDM symbol s output from the modulator 320 is provided to a symbol selector 504 as an input signal $X_1$ 511. The OFDM symbol s is also provided to a cyclic circulator 502. The cyclic circulator 502 cyclic-circulates the OFDM symbol s by the cyclic circulation distance d determined by a cyclic circulation distance determiner 503, generates a second input signal $X_2$ 512 of the symbol selector 504, and provides the generated second input signal $X_2$ 512 to the symbol selector 504. The symbol selector 504 receives the $X_1$ 511 and the $X_2$ 512, selects the $X_1$ 511 and the $X_2$ 512 in a symbol unit, and generates a stream of symbols. That is, the symbol selector 504 alternately selects the $X_1$ 511 and the $X_2$ 512. Therefore, the stream of the symbols output from the symbol selector 504 alternately includes a cyclic-circulated symbol and an original symbol. A process of sequentially selecting the $X_1$ 511 and the $X_2$ 512 is performed in step 714 of FIG. 7.

The two symbols generated by the cyclic circulator 330 are provided to one antenna through ordinary elements of the OFDM transmitter. That is, the stream of symbols output from the cyclic circulator 330 is provided to an IFFT block 340, where the provided symbol stream undergoes IFFT, for application of the OFDM technique. Into the OFDM symbol output from the IFFT block 340, a guard interval is by a guard interval inserter 350. The guard interval-inserted OFDM symbol is transmitted over a wireless channel through an RF processor 360 and an antenna ANT.

(2) Frequency Diversity Receiver Using Cyclic Circulation

Figure 4:
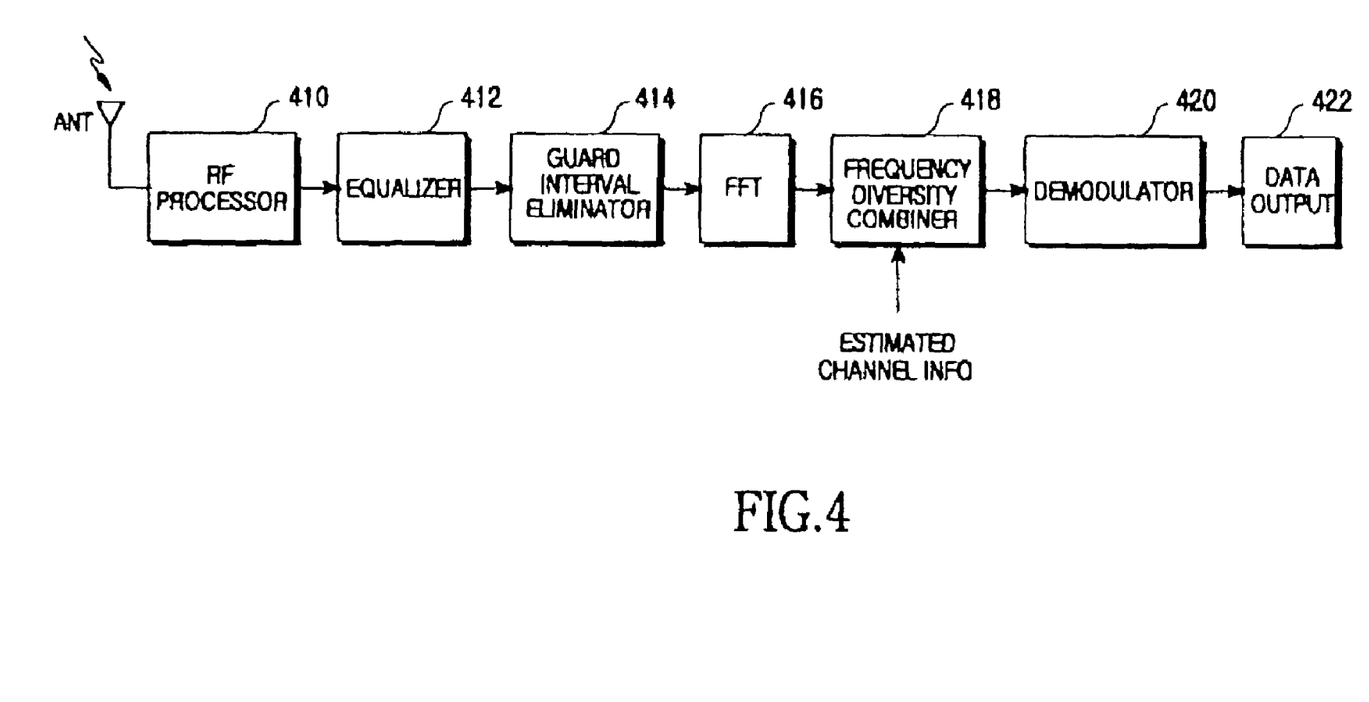
FIG. 4 illustrates a structure of a receiver in an OFDM mobile communication system according to an embodiment of the present invention.

FIG. 4 illustrates a structure of a receiver in an OFDM mobile communication system according to an embodiment of the present invention. Referring to FIG. 4, a signal received through an antenna ANT is converted to a baseband signal by an RF processor 410, and then provided to a guard interval eliminator 414. The guard interval eliminator 414 eliminates a guard interval from the output signal of the RF processor 410. The guard interval-eliminated input symbol vector is provided to an FFT block 416, where it undergoes FFT in step 812 of FIG. 8. In the receiver for an OFDM mobile communication system having N subcarriers, the output signal of the FFT block 416 is represented by $$r = H \cdot X + n \qquad \text{Equation (19)}$$

In Equation (19), r denotes an N×1 reception symbol vector, X denotes an N×1 transmission symbol vector, n denotes an N×1 noise vector, and H denotes an N×N diagonal matrix representing a frequency response of a channel.

The output signal of the FFT block 416, though it passed through a multipath fading channel in the OFDM mobile communication system, is represented by the simple product of a channel frequency response and a transmission signal in accordance with Equation (19). Therefore, a symbol transmitted by the frequency diversity transmitter using cyclic circulation can be expressed as $$\bar{r} = \begin{bmatrix} r_1 \\ r_2 \end{bmatrix} = \begin{bmatrix} H_1 & H_2 \\ H_2 & -H_1 \end{bmatrix}\begin{bmatrix} X_1 \\ X_2 \end{bmatrix} + \begin{bmatrix} n_1 \\ n_2 \end{bmatrix} = \overline{H} \cdot \overline{X} + \bar{n} \quad \text{Equation (20)}$$

In Equation (20), $H_1$ and $H_2$ represent diagonal matrices of channel frequency responses corresponding to transmission symbol vectors, and $X_1$ and $X_2$ represent the transmission symbol vectors.

The signal output from the FFT block 416 is provided to a frequency diversity combiner 418, and the frequency diversity combiner 418 performs frequency diversity combining on the symbols cyclic-circulated by the transmitter and the original symbols according to estimated channel information. A detailed structure of the frequency diversity combiner 418 is illustrated in FIG. 6.

Figure 6:
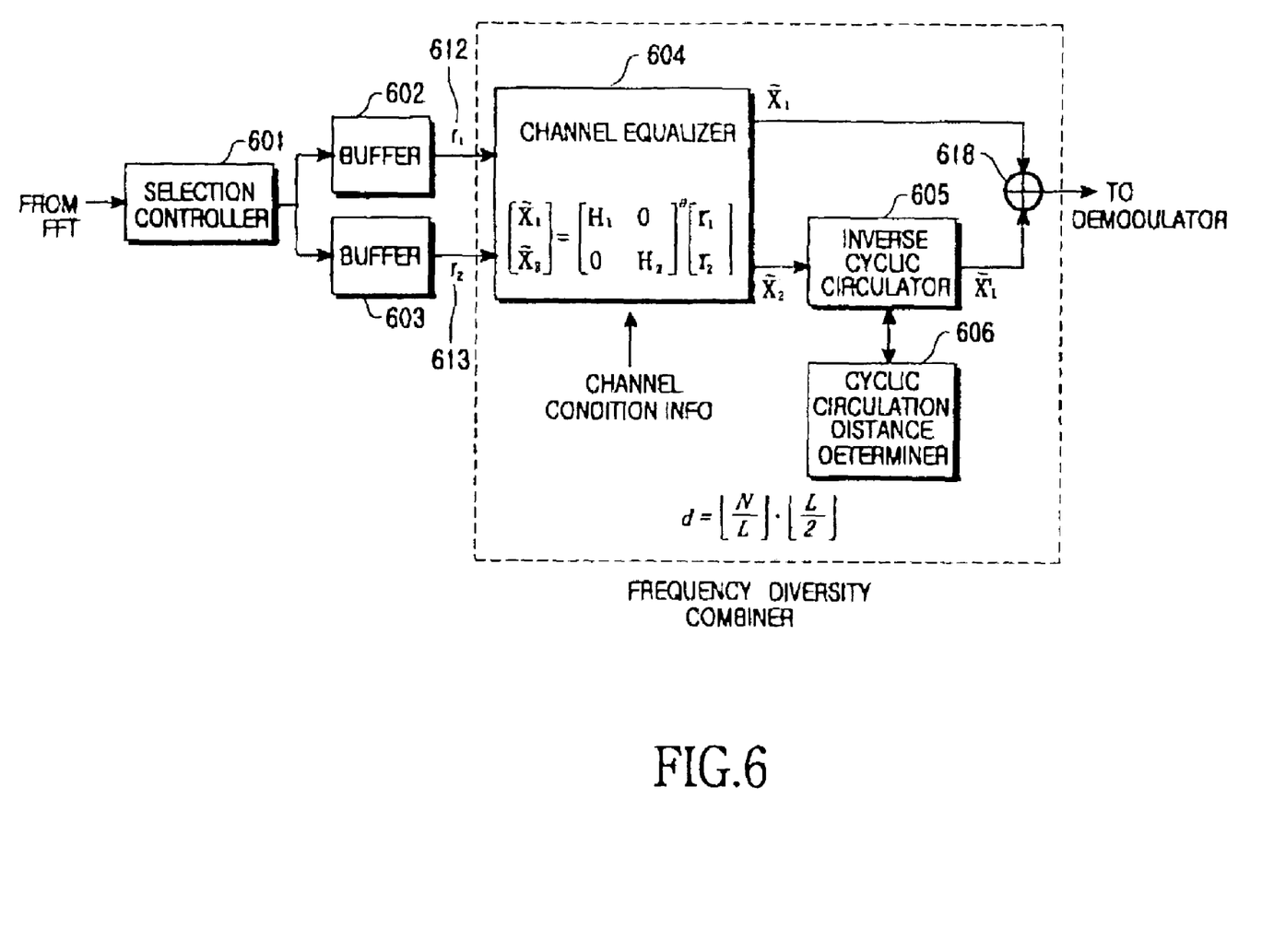
FIG. 6 illustrates a detailed structure of the frequency diversity combiner shown in FIG. 4.

FIG. 6 illustrates a detailed structure of the frequency diversity combiner 418, by way of example. Referring to FIG. 6, the input signal received from the FFT block 416 is provided to a selection controller 601, and the selection controller 601 separates the received signals according to their reception points $r_1$ and $r_2$, and then provides the separated signals to corresponding buffers 602 and 603. The buffers 602 and 603 store the signals separated on the time axis, and when the separated signals are stored as much as a predetermined amount, the buffers 602 and 603 provide the signals stored therein to a channel equalizer 604 in step 814 of FIG. 8. The output signals of the buffers 602 and 603 are represented by $r_1$ 612 and $r_2$ 613, respectively. In the $r_1$ and $r_2$ representing the output signals of the buffers 602 and 603, subscripts 1 and 2 indicate timing indexes.

Figure 8:
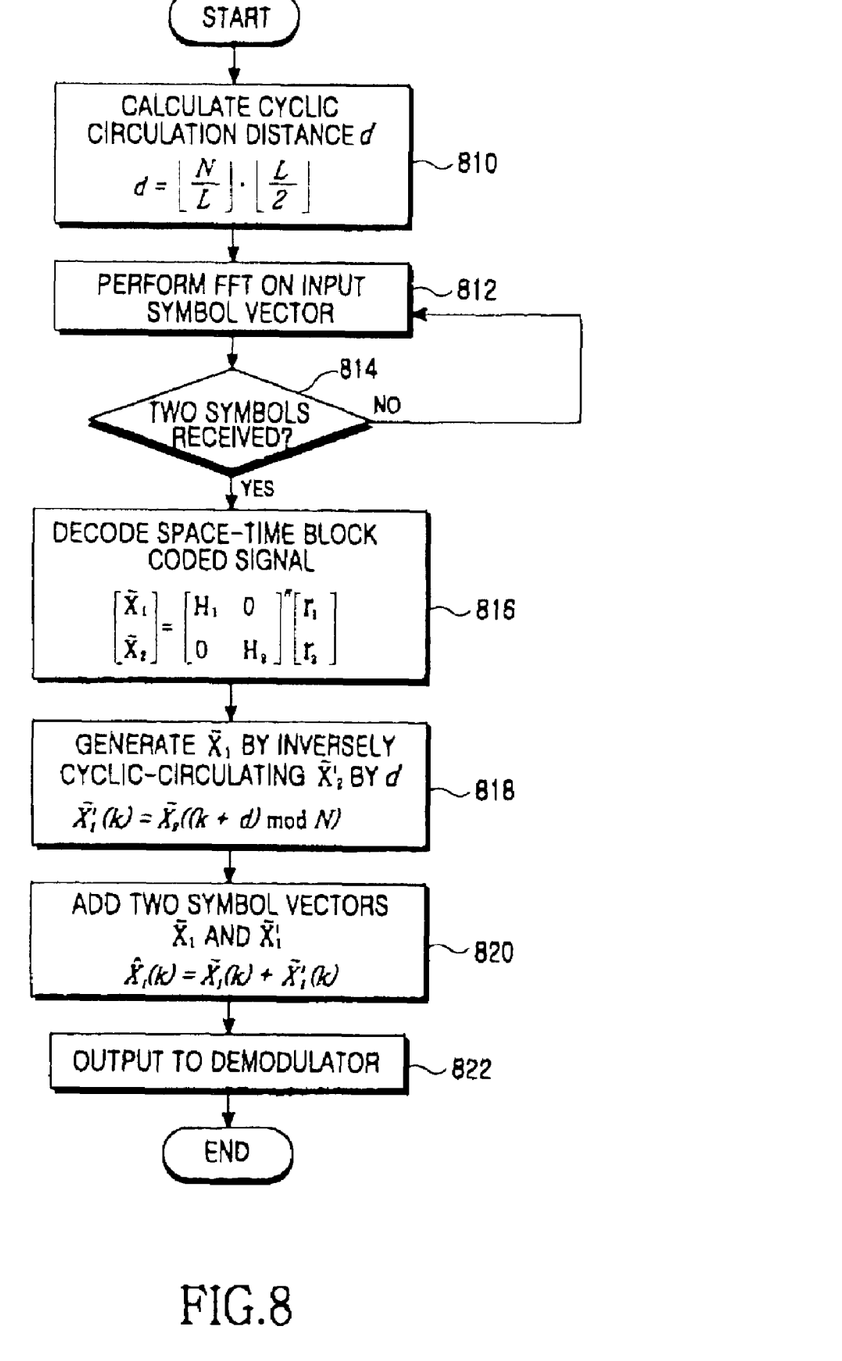
FIG. 8 illustrates an operation of a receiver according to an embodiment of the present invention.

The $r_1$ 612 and $r_2$ 613 are generated as signals X channel-equalized by the channel equalizer 604 based on channel condition information 614 in step 816 of FIG. 8. The channel-equalized signals X can be represented as the product of a matrix comprised of the $r_1$ 612 and $r_2$ 613 and Hermitian of a channel matrix $\overline{H}$, as follows $$\tilde{X} = \begin{bmatrix} \tilde{X}_1 \\ \tilde{X}_2 \end{bmatrix} = \overline{H}^H \cdot \bar{r} \quad \text{Equation (21)}$$

$$= \begin{bmatrix} H_1^* H_1 & 0 \\ 0 & H_2^* H_2 \end{bmatrix}\begin{bmatrix} X_1 \\ X_2 \end{bmatrix} + \overline{H}^H \cdot \bar{n}$$

Among decoded symbol vectors $\tilde{X}_1$ 615 and $\tilde{X}_2$ 616 of Equation (21), the $\tilde{X}_2$ 616 is generated by cyclic-circulating the $\tilde{X}_1$ 615. Therefore, the $\tilde{X}_2$ 616 was previously inversely cyclic-circulated by the cyclic circulation distance d by an inverse cyclic circulator 605 in step 818 of FIG. 8. For the inverse cyclic circulation operation, it is necessary to determine an inverse cyclic circulation distance d. The inverse cyclic circulation distance d is calculated by a cyclic circulation distance determiner 606 in step 810 of FIG. 8. Each subcarrier of the symbol $X_1'$ generated by inverse cyclic circulation represented by $$\tilde{X}_1'(k) = \tilde{X}_2((k+d) \bmod N), \; 0 \leq k \leq N-1$$

$$\tilde{X}_1' = [\tilde{X}_2(d) \ldots \tilde{X}_2(N-1) X_2(0) \ldots X_2(d-1)]^T \quad \text{Equation (22)}$$

Therefore, the $X_1'$ from which a noise component is eliminated by Equation (22), can be expressed as an actually transmitted OFDM symbol s by inverse cyclic circulation in accordance with Equation (23) below.

$$\tilde{X}_1' = \begin{bmatrix} |H_1(d)|^2 + |H_2(d)|^2 & 0 & \cdots & \cdots & \cdots & 0 \\ 0 & \ddots & \vdots & \vdots & \vdots & \vdots \\ \vdots & 0 & |H_1(N-1)|^2 + |H_2(N-1)|^2 & 0 & \cdots & 0 \\ 0 & \cdots & 0 & |H_1(0)|^2 + |H_2(0)|^2 & \cdots & 0 \\ 0 & \cdots & 0 & \ddots & \ddots & 0 \\ 0 & \cdots & \cdots & \cdots & 0 & |H_1(d-1)|^2 + |H_2(d-1)|^2 \end{bmatrix} \quad \text{Equation (23)}$$

$$\begin{bmatrix} s(0) \\ \vdots \\ s(N-d-1) \\ s(N-d) \\ \vdots \\ s(N-1) \end{bmatrix}$$

Since the $X_1$ and the $X_1'$ include the same transmission symbol vector s, the two vectors are added by an adder 618, and then generated as a symbol vector $\hat{X}_1$, in steps 820 and 822 of FIG. 8. A $k^{th}$ subcarrier of the symbol vector $\hat{X}_1$ is represented by $$\hat{X}_1(k) = (|H_1(k)|^2 + |H_2((k+d) \bmod N)|^2)s(k) = \lambda_k \cdot s(k), \text{ for } 0 \leq k \leq N-1 \quad \text{Equation (24)}$$

Generally, in the OFDM mobile communication system, although a channel has a time variant characteristic, the channel is not abruptly changed over the two symbols. Therefore, it can be assumed that the two channels are approximately equal, that is, $H_1 \approx H_2$. Accordingly, when repeatedly transmitting the same signal instead of cyclic-circulating the modulated symbol, it is not possible to obtain a diversity gain unless the channel is abruptly changed. However, since the cyclic circulation distance d is determined such that the channels among subcarriers are independent of each other in accordance with Equation (16), $H_1(k)$ is independent of $H_2(k+d) \bmod N$ even though $H_1 \approx H_2$. Therefore, it is noted that the transmission signal s(k) of Equation (24) can obtain a second-order frequency diversity gain. As a result, it is possible to obtain the same system performance as that of the system using 2 antennas, even with a single antenna. The frequency diversity-combined signal is provided to a demodulator (or QPSK/QAM demapper) 420, and an output signal ŝ(k) of the demodulator 420 is expressed as $$\hat{s}(k) = \arg\min_{\hat{s}(k)} \left\| \hat{X}(k)_1 - \lambda_k \cdot \hat{s}(k) \right\|^2, \quad 0 \leq k \leq N-1 \quad \text{Equation (25)}$$

As described above, the frequency diversity apparatus based on cyclic circulation according to the present invention can obtain a second-order frequency diversity gain without an increase in complexity, compared with the existing system. The present invention obtains the second-order maximum frequency diversity gain by simply transmitting a replica through cyclic circulation by a transmitter in the OFDM mobile communication system. Therefore, compared with the other diversity techniques, the novel frequency diversity technique can improve the system performance by a simple linear operation such as cyclic circulation, without an increase in complexity. In addition, since the novel OFDM mobile communication system is fully compatible with the existing OFDM mobile communication system, it is possible to improve the system performance while fully utilizing the existing system. Therefore, the present invention will be used to improve performance of the future mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission apparatus in a mobile communication system which modulates input data with a specific size into an OFDM (Orthogonal Frequency Division Multiplexing) symbol and transmits the OFDM symbol through an antenna, the apparatus comprising:

an OFDM symbol generator for generating replica data by cyclic-circulating the input data by a predetermined cyclic circulation distance d, and outputting a stream of the input data and the replica data as a data stream, comprising:

a cyclic circulation distance determiner for determining the cyclic circulation distance d;

a cyclic circulator for generating replica data by cyclic-circulating the input data by the determined cyclic circulation distance d; and a symbol selector for alternately selecting the input data and the replica data, and outputting the data system.

2. The transmission apparatus of claim 1, wherein the cyclic circulation distance d is calculated by $$d = \left\lfloor \frac{N}{L} \right\rfloor \cdot \left\lfloor \frac{L}{2} \right\rfloor$$

where d denotes the cyclic circulation distance, N denotes the total number of the OFDM symbols, and L denotes the number of multiple paths.

3. The transmission apparatus of claim 1, wherein the cyclic circulation distance d is fed back from a receiver.

4. The transmission apparatus of claim 3, wherein the feedback cyclic circulation distance is determined by the receiver on a basis of a position value of a subcarrier having a minimum correlation with a first subcarrier among subcarriers of the OFDM symbol.

5. A transmission method in a mobile communication system which modulates input data with a specific size into an OFDM (Orthogonal Frequency Division Multiplexing) symbol and transmits the OFDM symbol through an antenna, the method comprising the steps of:

(a) generating replica data by cyclic-circulating the input data by a predetermined cyclic circulation distance d, and outputting a stream of the input data and the replica data as a data stream, comprising:

determining the cyclic circulation distance d;

generating replica data by cyclic-circulating the input data by the determined cyclic circulation distance d; and alternately selecting the input data and the replica data, and outputting the data stream.

6. The transmission method of claim 5, wherein the cyclic circulation distance d is calculated by $$d = \left\lfloor \frac{N}{L} \right\rfloor \cdot \left\lfloor \frac{L}{2} \right\rfloor$$

where d denotes the cyclic circulation distance, N denotes the total number of the OFDM symbols, and L denotes the number of multiple paths.

7. The transmission method of claim 5, wherein the cyclic circulation distance d is fed back from a receiver.

8. The transmission method of claim 7, wherein the feedback cyclic circulation distance is determined by the receiver on a basis of a position value of a subcarrier having the minimum correlation with a first subcarrier among subcarriers of the OFDM symbol.

9. A reception apparatus for receiving a stream of OFDM (Orthogonal Frequency Division Multiplexing) symbols from a transmitter through a reception antenna in a mobile communication system which modulates input data with a specific size into an OFDM symbol and transmits the stream of OFDM symbols through a transmission antenna, the apparatus comprising:

an FFT (Fast Fourier Transform) block for generating a stream of data by performing FFT on the stream of OFDM symbols received through the reception antenna; and a frequency diversity combiner for separating the stream of data into a stream of cyclic-circulated data and a stream of non-cyclic-circulated data, inversely cyclic-circulating the stream of cyclic-circulated data by a predetermined cyclic circulation distance d, and adding the stream of inversely cyclic-circulated data and the steam of non-cyclic-circulated data, thereby outputting a stream of data.

10. The reception apparatus of claim 9, wherein the frequency diversity combiner comprises:

a cyclic circulation distance determiner for determining the cyclic circulation distance d;

a selection controller for separating the stream of data into the stream of cyclic-circulated data and the stream of non-cyclic-circulated data;

a buffer for buffering the stream of cyclic-circulated data and the stream of non-cyclic-circulated data in an OFDM symbol unit;

an inverse cyclic circulator for inversely cyclic-circulating the stream of cyclic-circulated data buffered in the buffer, by the cyclic circulation distance d; and an adder for adding the stream of inversely cyclic-circulated data and the steam of non-cyclic-circulated data, thereby outputting a stream of data.

11. The reception apparatus of claim 9, wherein the cyclic circulation distance d is calculated by $$d = \left\lfloor \frac{N}{L} \right\rfloor \cdot \left\lfloor \frac{L}{2} \right\rfloor$$

where d denotes the cyclic circulation distance, N denotes the total number of the OFDM symbols, and L denotes the number of multiple paths.

12. The reception apparatus of claim 9, wherein the cyclic circulation distance d is fed back to the transmitter.

13. The reception apparatus of claim 12, wherein the cyclic circulation distance is determined on a basis of a position value of a subcarrier having the minimum correlation with a first subcarrier among subcarriers of the OFDM symbol.

14. A reception method for receiving a stream of OFDM (Orthogonal Frequency Division Multiplexing) symbols from a transmitter through a reception antenna in a mobile communication system which modulates input data with a specific size into an OFDM symbol and transmits the stream of OFDM symbols through a transmission antenna, the method comprising the steps of:

(a) generating a stream of data by performing FFT (Fast Fourier Transform) on the stream of OFDM symbols received through the reception antenna; and (b) separating the stream of data into a stream of cyclic-circulated data and a stream of non-cyclic-circulated data, inversely cyclic-circulating the stream of cyclic-circulated data by a predetermined cyclic circulation distance d, and adding the stream of inversely cyclic-circulated data and the steam of non-cyclic-circulated data, thereby outputting a stream of data.

15. The reception method of claim 14, wherein the step (b) comprises the steps of:

determining the cyclic circulation distance d;

separating the stream of data into the stream of cyclic-circulated data and the stream of non-cyclic-circulated data;

buffering the stream of cyclic-circulated data and the stream of non-cyclic-circulated data in an OFDM symbol unit;

inversely cyclic-circulating the buffered stream of cyclic-circulated data by the cyclic circulation distance d; and adding the stream of inversely cyclic-circulated data and the steam of non-cyclic-circulated data, thereby outputting a stream of data.

16. The reception method of claim 14, wherein the cyclic circulation distance d is calculated by $$d = \left\lfloor \frac{N}{L} \right\rfloor \cdot \left\lfloor \frac{L}{2} \right\rfloor$$

where d denotes the cyclic circulation distance, N denotes the total number of the OFDM symbols, and L denotes the number of multiple paths.

17. The reception method of claim 14, wherein the cyclic circulation distance d is fed back to the transmitter.

18. The reception method of claim 17, wherein the cyclic circulation distance is determined on a basis of a position value of a subcarrier having the minimum correlation with a first subcarrier among subcarriers of the OFDM symbol.

19. The transmission apparatus of claim 1, wherein the apparatus further comprises:

an Inverse Fast Fourier Transform (IFFT) block for performing an IFFT on the data stream output from the OFDM symbol generator, and generating a stream of OFDM symbols.

20. The transmission method of claim 5, wherein the method further comprises:

performing IFFT on the data stream, and generating a stream of OFDM symbols.

* * * * *